United States Patent [19]

Horiuchi

[11] Patent Number: 4,960,365
[45] Date of Patent: Oct. 2, 1990

[54] HYDRAULIC CONTROL APPARATUS

[75] Inventor: Hitoshi Horiuchi, Settsu, Japan

[73] Assignee: Daikin Industries, Ltd., Osaka, Japan

[21] Appl. No.: 442,625

[22] Filed: Nov. 29, 1989

[30] Foreign Application Priority Data

Dec. 1, 1988 [JP] Japan .................................. 63-306438
Oct. 5, 1989 [JP] Japan .................................. 1-260661

[51] Int. Cl.$^5$ .................... F15B 13/043; F15B 13/044
[52] U.S. Cl. .................................. 417/222; 137/330;
137/625.64; 137/625.65; 251/129.05
[58] Field of Search .............. 137/330, 625.64, 625.65;
251/129.05; 417/222

[56] References Cited

U.S. PATENT DOCUMENTS 4,456,434 6/1984 El Ibiary .................... 137/625.65 X Primary Examiner—Gerald A Michalsky
Attorney, Agent, or Firm—Birch, Stewart, Kolasch & Birch

[57] ABSTRACT

A hydraulic control apparatus has a transistor which is changed over by a control signal inputted to an input terminal thereof; and a solenoid controlled valve having a spool actuated by a DC solenoid to be driven by exciting current whose pulse duration has been controlled by the transistor. The hydraulic control apparatus is characterized by having an adder for adding a command signal and an AC signal having a dither frequency; an oscillator for generating a signal having a constant frequency higher than the maximum frequency of the command signal; a subtractor for subtracting a signal representing pulse duration of the exciting current and inputted through a low-pass filter from a signal outputted from the adder; and a comparator for comparing a signal outputted from the subtractor with a signal outputted from the oscillator, outputting a pulse width-modulated control signal to the input terminal of the transistor so as to control the ON and OFF of the transistor, so that the solenoid controlled valve can be controlled with a fast response and high gain and a small amount of phase delay.

11 Claims, 16 Drawing Sheets

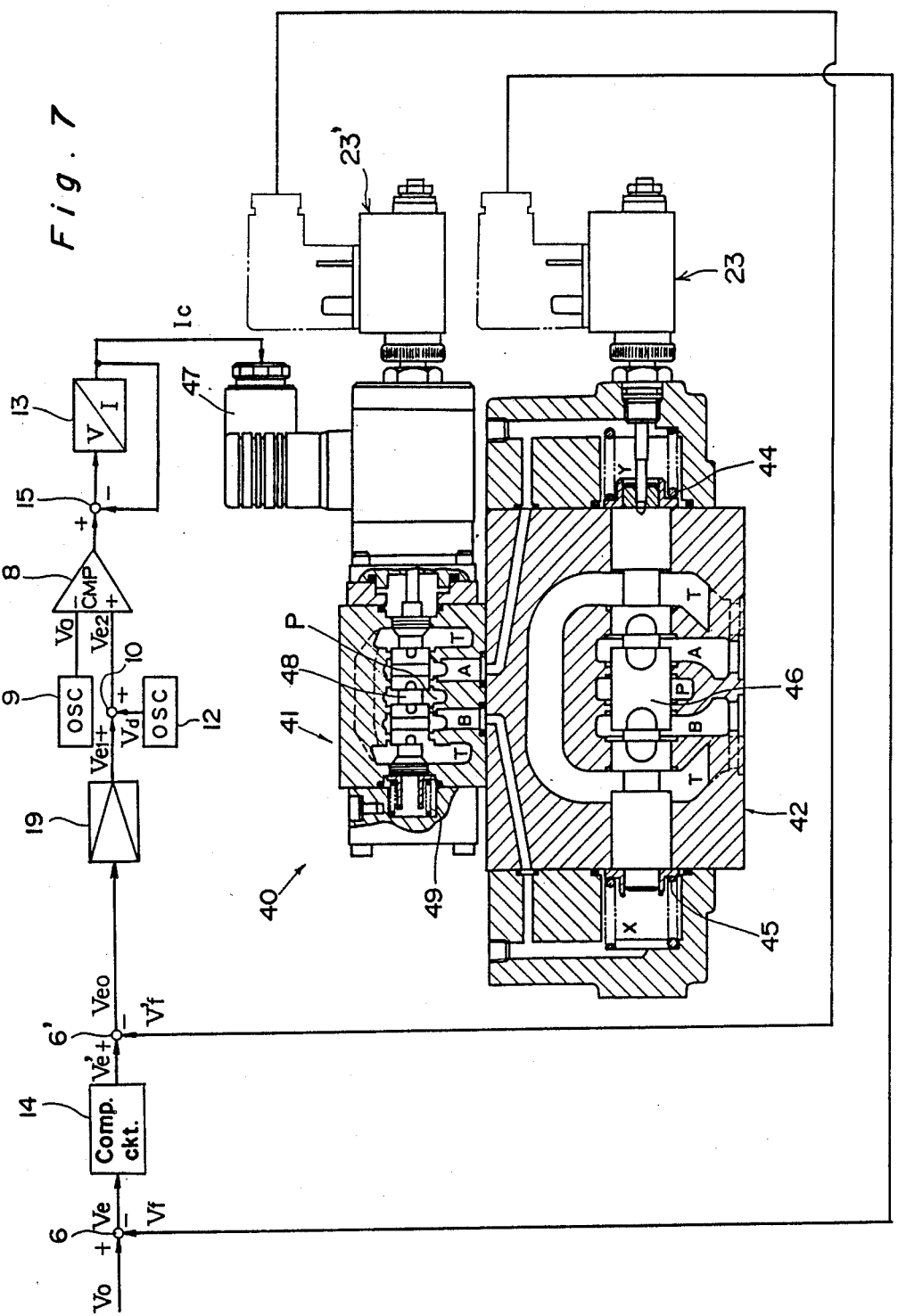

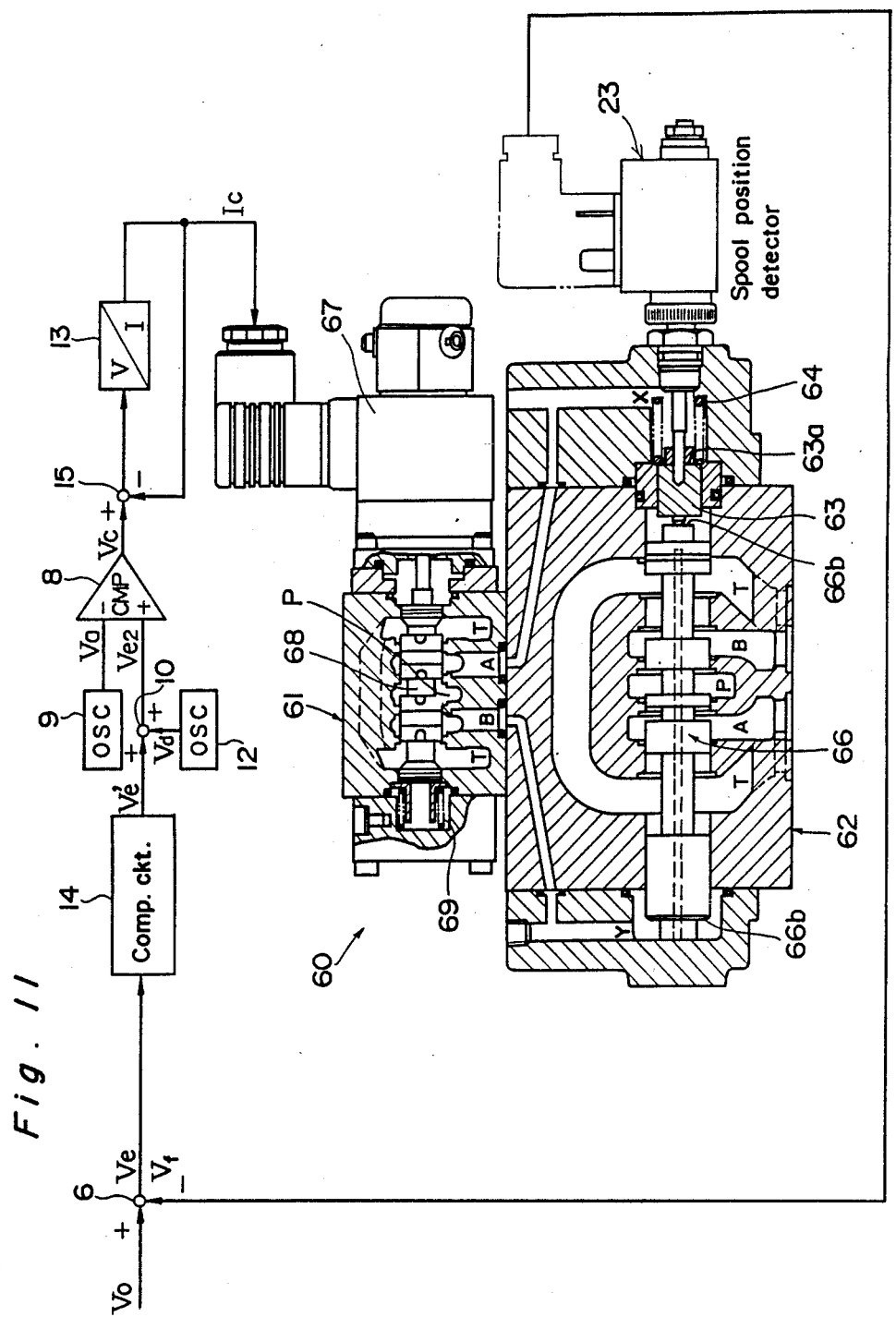

HYDRAULIC CONTROL APPARATUS

BACKGROUND OF THE INVENTION

The present invention relates to a hydraulic control apparatus for controlling electric current for exciting a solenoid of a solenoid controlled valve.

A known hydraulic control apparatus of this kind is shown in FIG. 16 which is a block diagram of the apparatus. In this hydraulic control apparatus, an npn transistor 3 is interposed between a solenoid 1 of a solenoid controlled valve and a DC power supply 2 in such a manner that the emitter E of the transistor 3 is connected to the solenoid 1 and the collector C thereof is connected to the DC power supply. A pulse-width modulated control signal Vc, whose ON/OFF time ratio that is a ratio of ON time to OFF time varies, is applied to the base B of the transistor 3. Only when the control signal Vc is ON, electric current flows between the collector C and the emitter E, so that the solenoid 1 is excited.

The control signal Vc is generated as follows: Electric current I which flows through the solenoid 1 is fed back to a subtractor 6 as a voltage signal Vf through a noise removing low-pass filter 5. The subtractor 6 determines a deviation between the voltage signal Vf and a command signal Vo indicative of a target stop position of a spool (not shown). A deviation signal Ve indicative of the deviation is inputted to the noninverting terminal of a comparator 8 through an amplifier 7. To the inverting terminal of the comparator 8 is applied an AC signal from an oscillator. The AC signal Vd has a dither frequency of 100–300 Hz applied to prevent the spool of the solenoid controlled valve from being hydraulically locked to a cylindrical chamber. The comparator 8 determines a difference between the levels of the signals Ve and Vd inputted to both terminals thereof, thus outputting a pulse signal which becomes ON when the difference between Ve and Vd (Ve−Vd) is positive. Accordingly, the higher the level of the deviation signal Ve, with respect to the level of the AC signal Vd, outputted from the amplifier 7 becomes in a direction shown by an arrow U in FIG. 16, the greater the ON/OFF time ratio of the pulse signal whose ON time is shown by heavy lines is, whereas as the level of the deviation signal Ve becomes lower, the ON/OFF time ratio of the pulse signal decreases. Thus, the deviation signal Ve is pulse-width modulated to produce the control signal Vc which is applied to the base B of the transistor 3. The higher the level of the deviation signal Ve is, the stronger the solenoid 1 is excited. As a result, the spool is displaced to a great extent and a negative feedback of the spool displacement to the subtractor 6 is performed. The spool is displaced until the level of the deviation signal Ve becomes 0, when the spool is at the target stop position. A diode 4 disposed in parallel with the solenoid 1 serves as a means for reducing a surge voltage which is generated when the transistor 3 is deenergized.

According to the hydraulic control apparatus having the above-described construction, the exciting current of the solenoid controlled valve is controlled by feeding back the signal to the transistor 3 through the subtractor 6, the amplifier 7 and the comparator 8, and irrespective of the strength of the exciting current, a dither in the range from 100–300 Hz is applied to the spool so that the spool can be prevented from being hydraulically locked to the cylindrical chamber and the transistor 3 is prevented from heating and the temperature thereof is prevented from rising even though the transistor 3 is kept to be ON.

However, in the above-described hydraulic control apparatus, the AC signal Vd having the same frequency (100–300 Hz) as that of a dither is employed as a carrier wave to pulse width-modulate the deviation signal Ve. Accordingly, the deviation signal Ve which changes in a frequency higher than the dither frequency Vd cannot be pulse width-modulated. Therefore, when the command signal having a high frequency is inputted to the noninverting terminal of the subtractor 6, as shown in FIG. 17a which is a Bode plot representing the characteristics of gain versus frequency, the gain of electric current supplied to the solenoid 1 through the transistor 3 is rapidly reduced at a frequency of more than 20 Hz and fluctuates to a great extent in the vicinity of a frequency of 100–300 Hz. Thus, the spool of the solenoid controlled valve cannot be controlled as desired. In addition, since the frequency of the AC signal Vd is as low as 100–300 Hz, it is necessary to use the low-pass filter whose the time constant is great. Therefore, the phase delay of the feedback signal is outstanding. As shown in FIG. 17b which is a Bode plot representing a characteristics of phase shift versus frequency, the difference between the phase of the electric current supplied to the solenoid 1 and the phase of the command signal becomes great at the frequency of more than 20 Hz and changes extremely in the vicinity of the frequency of 100–300 Hz. Thus, the spool cannot be controlled as desired.

FIG. 18 shows the control characteristics of the hydraulic control apparatus shown in FIG. 16 measured when it is applied to a solenoid controlled proportional throttling control valve which controls the supply of hydraulic fluid to and the discharge thereof from the swash plate control cylinder of a variable displacement hydraulic pump. The hydraulic control apparatus is incapable of favorably controlling the spool of the control valve when the frequency of the command signal is in the range from 100 to 300 Hz as described above. Therefore, as shown in FIG. 18, when command signals Vop and Voq indicating the deliveries pressure and the discharge amount of hydraulic fluid are changed stepwise, it takes 0.3 seconds for the exciting current Ic and the swash plate to become steady-state. That is, the response characteristics of electric current and flow rate of the hydraulic fluid are unfavorable. Further, FIG. 18 indicates that it takes about 0.1 seconds for the delivery pressure of the hydraulic fluid to rise to an appropriate degree and that the delivery pressure fluctuates in a great extent after it has risen to the appropriate degree.

SUMMARY OF THE INVENTION

It is therefore an object of the present invention to provide a hydraulic control apparatus in which a command signal and an AC signal having a dither frequency are added to each other by an adder, a deviation signal corresponding to the difference between a signal outputted from the adder and a feedback signal representing pulse duration of exciting current of a solenoid is pulse width-modulated by a carrier wave having a constant frequency higher than the maximum frequency of the command signal, and the pulse width-modulated signal is supplied to the solenoid as exciting current, whereby the spool provided in a solenoid controlled valve to be controlled by the solenoid can be prevented from being hydraulically locked and a hydraulic system including the solenoid controlled valves can be controlled with a small amount of phase delay and a fast response and a high gain.

In order to achieve the object, a hydraulic control apparatus according to one preferred embodiment of the present invention has a switching element which is changed over by a control signal inputted to an input terminal thereof; and a solenoid controlled valve having a spool actuated by a DC solenoid to be driven by exciting current whose pulse duration has been controlled by the switching element, and is characterized by further comprising an adder for adding a command signal and an AC signal having a dither frequency to each other; an oscillator for generating a signal having a constant frequency higher than the maximum frequency of the command signal; a subtractor for subtracting a signal representing pulse duration of the exciting current and inputted through a low-pass filter from a signal outputted from the adder; and a comparator for comparing a signal outputted from the subtractor with a signal outputted from the oscillator, outputting a pulse width-modulated control signal to the input terminal of the switching element so as to control the ON and OFF of the switching element.

According to the hydraulic control apparatus, the adder adds the command signal and the AC signal having a dither frequency to each other, and the signal produced by the addition is inputted to the subtractor which determines the deviation between the signal generated by the addition and the feedback signal representing pulse duration of the exciting circuit of the solenoid and inputted through the low-pass filter. The deviation signal thus produced is inputted to the comparator. The comparator compares the deviation signal with the signal having a constant frequency higher than the maximum frequency of the command signal outputted from the oscillator. The deviation signal is pulse width-modulated by the signal outputted from the oscillator so as to generate the control signal. The comparator outputs the pulse width-modulated control signal to the signal input terminal of the switching element. In the pulse width modulation of the control signal, the higher the level of the voltage of the deviation signal is, the greater the ratio of ON time of the control signal to OFF time thereof. The switching element is ON only when the control signal is ON, thus supplying to the solenoid the exciting current which is rapidly excited and deexcited Consequently, the solenoid is excited in proportion to the pulse width, which leads to the actuation of the solenoid controlled valve. In this operation, the command signal is pulse width-modulated by the signal having the constant frequency higher than the maximum frequency of the command signal. Therefore, the command signal whose voltage is changed at a high speed can always be faithfully pulse width-modulated and the low-pass filter of the feedback circuit can be used with the time constant being small. Thus, there are neither rapid reduction and great change of gain in this apparatus nor a great phase delay in the exciting current, so that the hydraulic system can be controlled with a very fast speed and a high gain. Further, since the AC signal having a dither frequency is added to the command signal, the spool can be prevented from being hydraulically locked to a cylindrical chamber by always applying a dither to the solenoid controlled valve.

A hydraulic control apparatus according to another preferred embodiment of the present invention has a solenoid controlled valve having a spool driven by DC solenoid means; a detecting section for detecting the displacement of the spool of the solenoid controlled valve; a subtractor for subtracting a detection signal outputted from the detecting section from a command signal indicating a target value; a compensation circuit for compensating a deviation signal outputted from the subtractor for at least one of gain and phase shift; and a first voltage-current converter for converting a compensated deviation signal outputted from the compensation circuit into exciting current so as to output the exciting current to the DC solenoid means of the solenoid controlled valve, and is characterized by further comprising an adder for adding an AC signal having a dither frequency to the compensated deviation signal outputted from the compensation circuit; an oscillator for generating a signal having a constant frequency higher than the maximum frequency of the command signal; and a comparator for comparing the signal outputted from the oscillator and a signal outputted from the adder with each other so as to output a pulse width-modulated voltage signal to the first voltage-current converter.

BRIEF DESCRIPTION OF THE DRAWINGS

These and other objects and features of the present invention will become apparent from the following description taken in conjunction with the preferred embodiment thereof with reference to the accompanying drawings, in which:

FIG. 1a is a block diagram showing the fundamental embodiment of a hydraulic control apparatus in accordance with the present invention;

FIG. 1b is a diagram showing a solenoid controlled valve to be driven by a solenoid shown in FIG. 1a;

FIG. 7 is a block diagram showing a modification of the hydraulic control apparatus shown in FIG. 6;

FIG. 11 is a block diagram showing an example in which a solenoid controlled throttling valve of a differential type is used;

DETAILED DESCRIPTION OF THE PREFERRED EMBODIMENTS

Figures 1A, 1B:
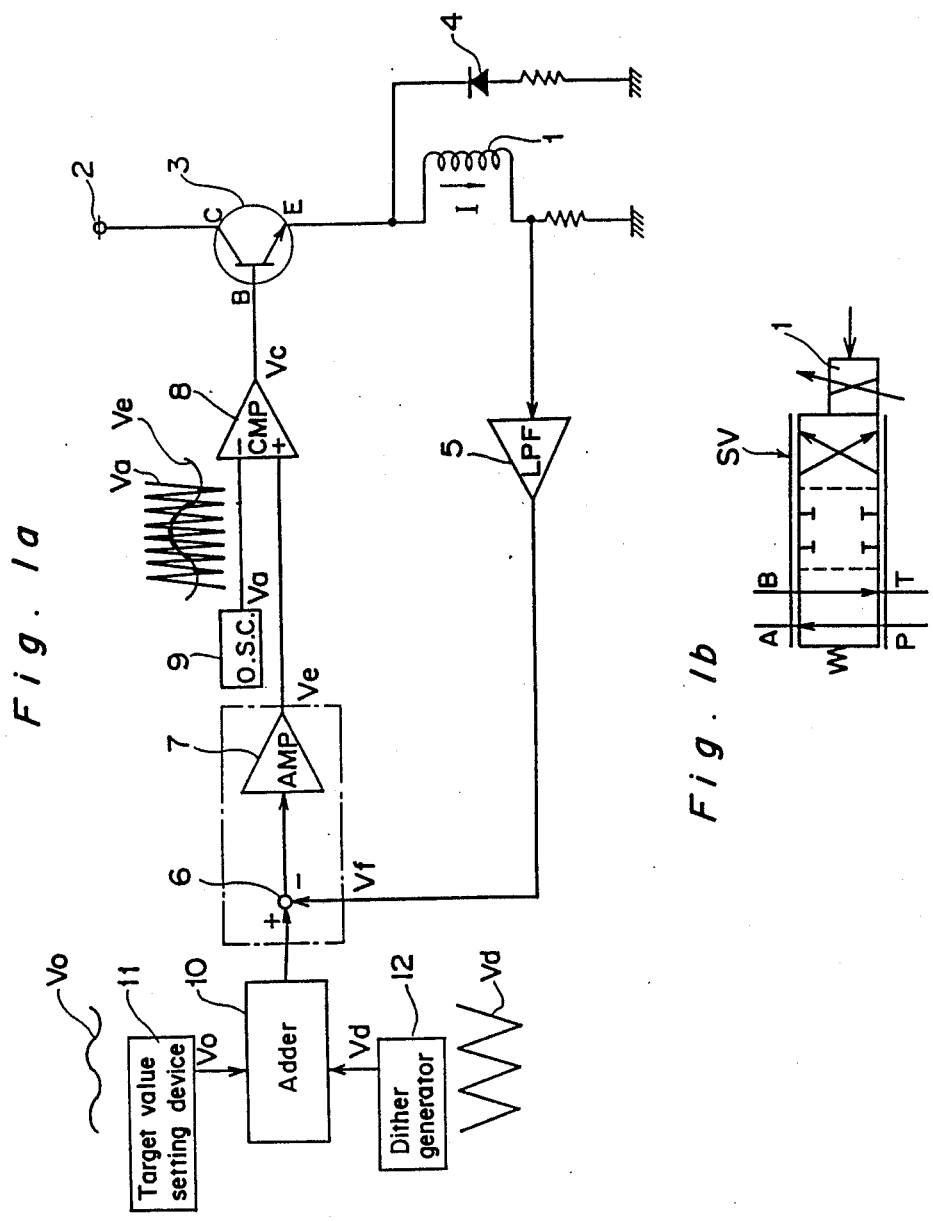

Before the description of the present invention proceeds, it is to be noted that like parts are designated by like reference numerals throughout the accompanying drawings.

FIG. 1 shows the embodiment of a hydraulic control apparatus in accordance with the present invention. This hydraulic control apparatus comprises a solenoid controlled valve SV (refer to FIG. 1b) which drives a spool (not shown) through a DC solenoid 1 and an electric circuit which is described later. As shown in FIG. 1a, in this circuit, a transistor 3 serving as a switching element is interposed between the solenoid 1 and a DC power supply 2, and a diode 4 for preventing the occurrence of a reverse current is provided in parallel with the solenoid 1. A subtractor 6 performs a subtraction between a signal outputted from an adder 10 and a feedback signal which has been outputted from the solenoid 1 and passed through a low-pass filter 5. A deviation signal Ve generated by the subtraction is outputted from the subtractor 6 to the noninverting terminal of a comparator 8 through an amplifier 7, and a carrier wave Va outputted from an oscillator 9 is inputted to the inverting terminal of the comparator 8. The comparator 8 pulse width-modulates the deviation signal Ve using the carrier wave Va, thus outputting a control signal Vc to the base B of the transistor 3.

The members 1 through 9 described above are the same as the known members previously described with reference to FIG. 16 except that the oscillator 9 generates the carrier wave Va with a constant frequency, for example, 5 KHz higher that the maximum frequency of the command signal and that the cut-off frequency of the low-pass filter 5 is higher than a dither frequency (100–300 Hz) and lower than the maximum frequency, for example, 1 KHz of the command signal. The adder 10 adds with each other a command signal Vo corresponding to a desired position of the spool outputted from a target value setting device 11 and an AC signal Vd having a dither frequency outputted from a dither generator 12, thus outputting a signal generated by the addition to the subtractor 6.

The operation of the hydraulic control apparatus having the above described construction is described below.

The adder 10 adds the command signal Vo outputted from the target value setting device 11 and the AC signal Vd outputted from the dither generator 12. The signal generated by the addition is inputted to the subtractor 6. The subtractor 6 calculates the difference between the signal generated by the addition and a feedback signal Vf which has been received from the solenoid 1 through the low-pass filter 5. The signal generated by the subtraction is inputted as a deviation signal Ve to the comparator 8 through the amplifier 7. The comparator 8 performs the pulse width modulation of the deviation signal Ve using the carrier wave Va outputted from the oscillator 9, thus outputting the control signal Vc to the base B of the transistor 3. The higher the level of the deviation signal Ve is, the greater the ratio of the ON time of the control signal Vc to the OFF time thereof. Consequently, the transistor 3 is energized at a short period as shown by heavy lines in FIG. 1 only when the pulse width-modulated control signal Vc is ON. Exciting current I which is turned on and off at a high speed is supplied from the DC power supply 2 to the solenoid 1 through the transistor 3 and the solenoid 1 is excited in duration in proportion to the pulse width of the control signal Vc. As a result, the spool of the solenoid controlled valve SV is driven in proportion to the pulse width of the control signal Vc.

Figure 2A:
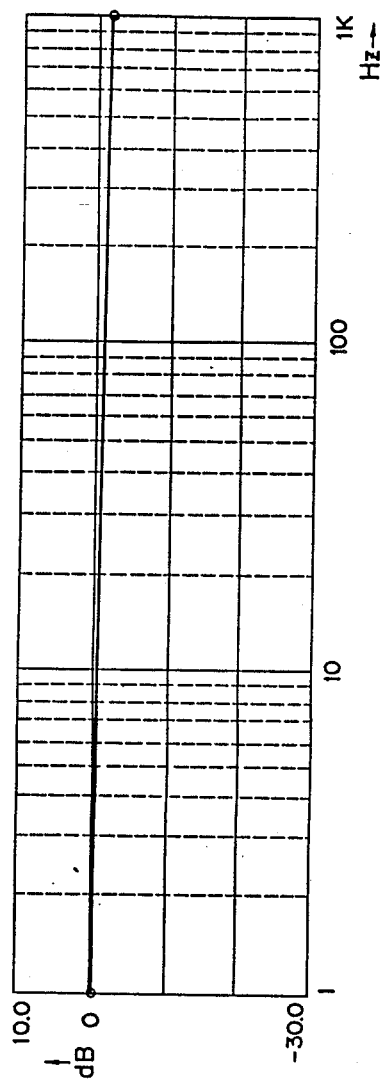
FIGS. 2a and 2b are Bode plots showing the operation characteristics of a control valve in accordance with the above-described embodiment.
Figure 2B:
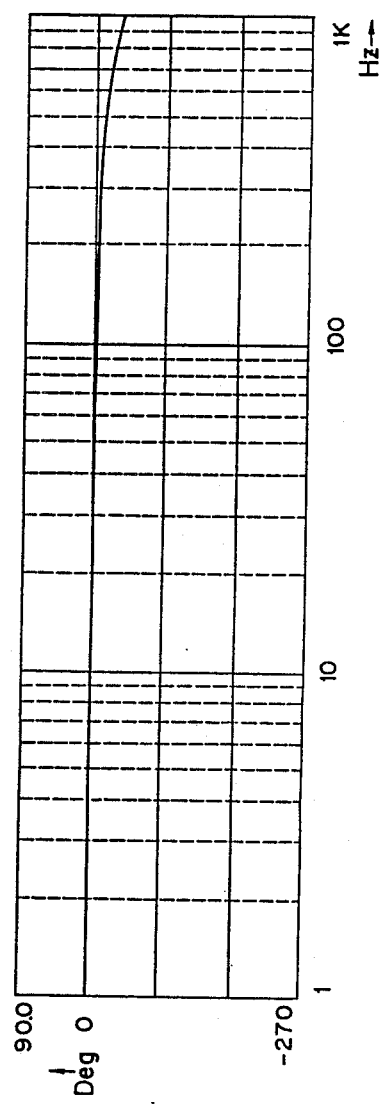
Figure 17A:
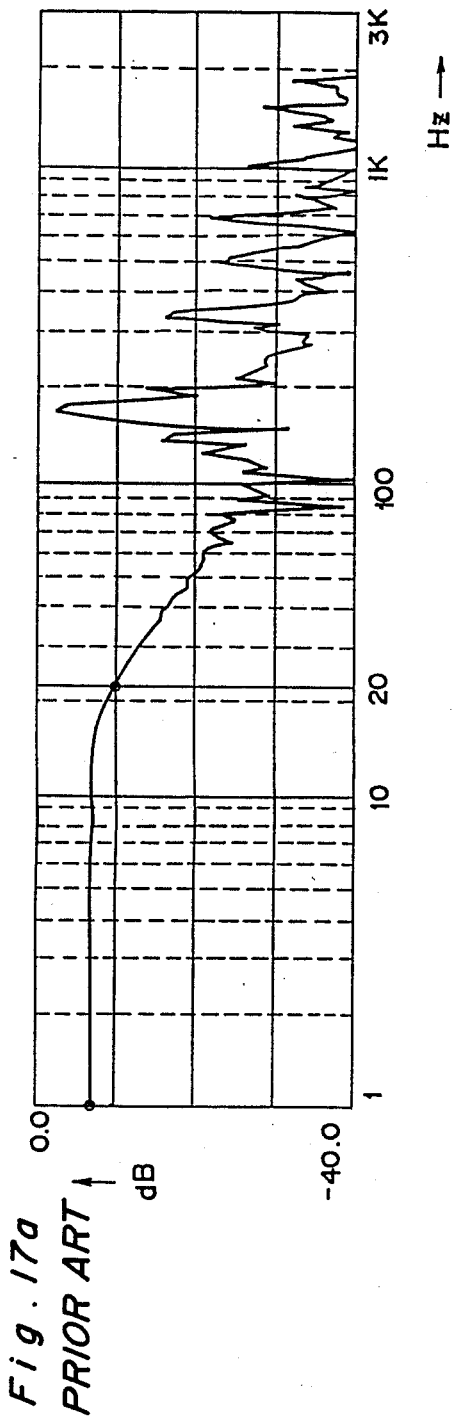
FIGS. 17a and 17b are graphs showing the operation characteristics of a control valve of a known hydraulic control apparatus.
Figure 17B:
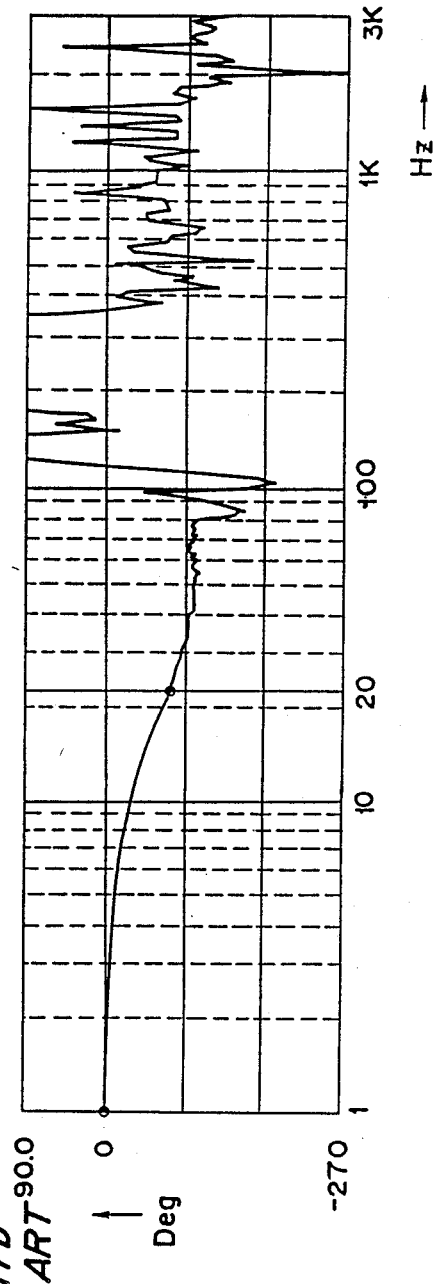

In this operation, the command signal Vo is pulse width-modulated by the carrier wave Va having a constant frequency higher than the maximum frequency of the command signal Vo. Therefore, even though the voltage of the command signal Vo changes at a high speed, the command signal Vo can always be faithfully pulse width-modulated and the low-pass filter 5 of the feedback circuit, the time constant of which is smaller than known ones can be used. Accordingly, such disadvantages of the known hydraulic control apparatus as described with reference to FIGS. 17a and 17b do not occur. That is, the rapid reduction and large fluctuation of the gain of the hydraulic control apparatus do not occur and there is no phase delay in the exciting current flowing through the solenoid either. Further, the response speed of the exciting current which flows through the solenoid 1 is approximately 50 times as fast as the response speed of the exciting current which flows a solenoid of a known hydraulic control apparatus. Thus, the solenoid controlled valve SV and the hydraulic control apparatus can be controlled with a fast response and a high gain. Also, the hydraulic system thereof is capable of withstanding an external disturbance This can be understood from the graphs shown in FIGS. 2a and 2b showing the gain of the hydraulic control apparatus and the phase delay of the exciting current flowing the transistor 3 measured using a signal whose frequency is in the range appropriate for controlling the solenoid controlled valve SV and the hydraulic system and in the same condition as that in which the frequency of the known hydraulic control apparatus are measured, the result of which are shown in FIGS. 17a and 17b. That is, the reduction of gain of the hydraulic control apparatus and the phase delay of the exciting current are slight until the frequency reaches 1 KHz and the curves show no fluctuations. Further, since the adder 10 superposes the AC signal Vd corresponding to the dither frequency on the command signal Vo, the spool can be prevented from being subjected to a friction or locking to the cylindrical chamber by always applying the dither to the spool of the solenoid controlled valve SV through the solenoid 1. Since the transistor 3 is rapidly on and off in the substantial same period as the carrier wave Va by the pulse width-modulated control signal Vc, the transistor 3 is not heated or the temperature thereof does not rise. Thus, the transistor 3 is not damaged.

Figure 3:
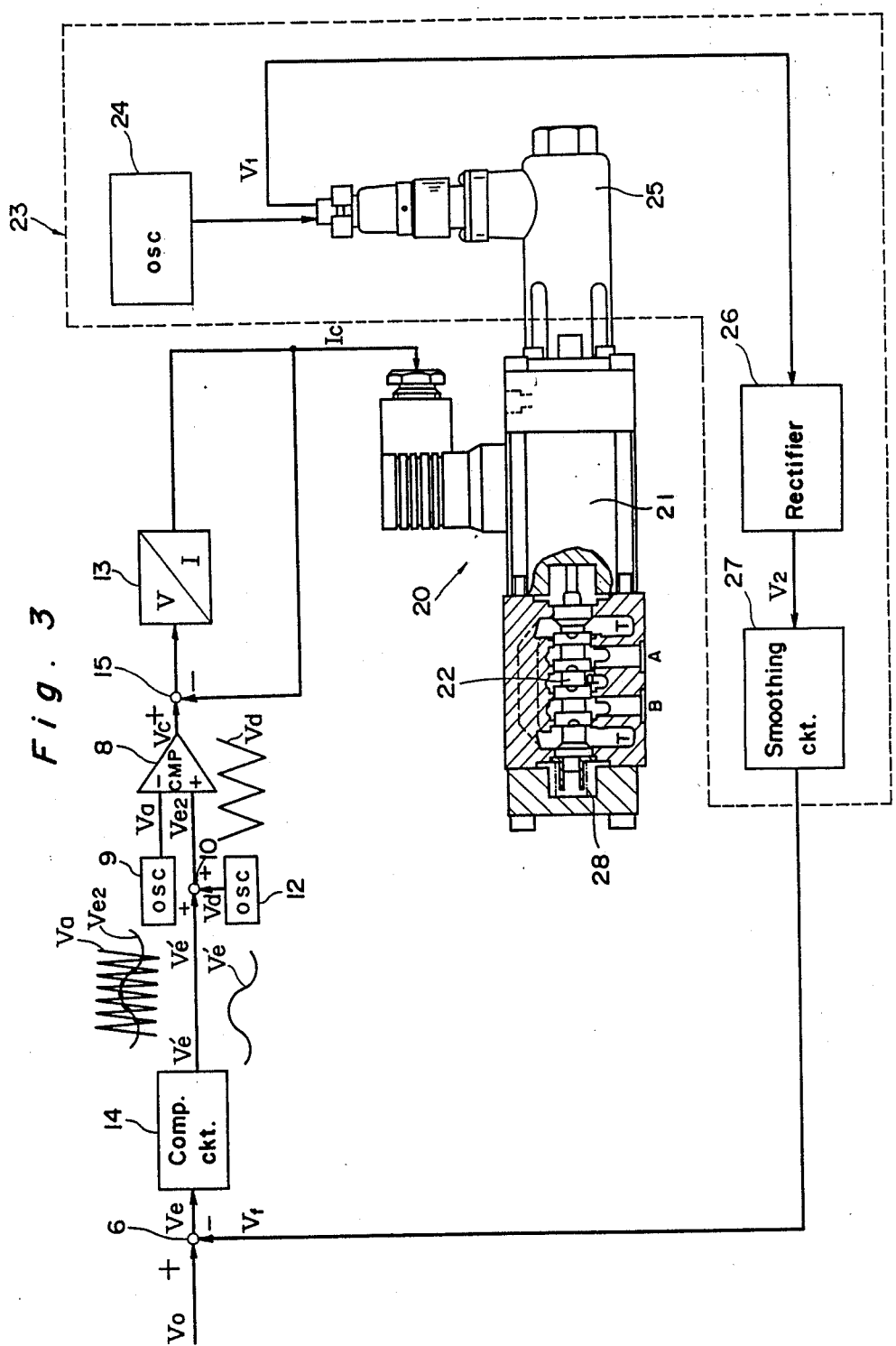
FIG. 3 is a block diagram showing an example in which a single solenoid proportional controlled throttling valve of direct-acting type is used.

FIG. 3 shows an embodiment of a hydraulic control apparatus in accordance with the present invention. In the electric circuit of this embodiment, a voltage-current converter 13 having a subtractor 15 for performing a feedback compensation is used instead of the switching element 3, or the transistor 3 of the electric circuit shown in FIG. 1, the positions of the adder 10 and the subtractor 6 are opposite to those of the embodiment shown in FIG. 1, and a compensation circuit 14 is interposed therebetween. The solenoid controlled valve SV to be controlled by the electric circuit of hydraulic control apparatus is a solenoid controlled proportional throttling directional control valve 20 of spring offset direct-acting type.

The electric circuit comprises the subtractor 6 which determines a deviation signal Ve ($=Vo-Vf$) by performing a subtraction between the command signal Vo and the detection signal Vf outputted from a spool position detector 23 of the throttling directional control valve 20; the compensation circuit 14 which compensates the deviation signal Ve outputted from the subtractor 6; an oscillator 12 which generates the AC signal Vd having a dither frequency (100–400 Hz); an adder 10 which adds the AC signal Vd to a compensated deviation signal Ve' outputted from the compensation circuit 14; an oscillator 9 which generates a signal Va having a constant frequency, for example, 5 KHz higher than the maximum frequency of the command signal Vo; a comparator 8 which compares the signal Va inputted to the inverting terminal thereof and a signal Ve$_2$ ($=Ve'+Vd$) inputted to the noninverting terminal thereof with each other so as to output a pulse width-modulated control signal Vc; and a voltage-current converter 13 which outputs exciting current Ic to the solenoid 21 of the throttling directional control valve 20 in response to the control signal Vc which has been compensated by the feedback.

The spool position detector 23 of the throttling directional control valves 20 consists of an oscillator 24, a differential transformer 24, a rectifier circuit 26 and a smoothing circuit 27. The differential transformer 25 consists of a movable core (not shown) which is fixed to one end portion of the spool 22, and primary and secondary coils (not shown) which surround the movable coil. In response to an AC voltage of, for example, 3 KHz outputted from the oscillator 24 to the primary coil, the differential transformer 25 outputs a voltage signal V$_1$ having an amplitude proportional to the displacement of the movable core through the secondary coil. The rectifier circuit 26 half-wave rectifies the voltage signal V$_1$ and the smoothing circuit 27 smoothens a voltage V$_2$ outputted from the rectifier circuit 26, thus outputting the detection signal Vf. The spool 22 is urged by a spring 28 so as to move to close passages between all ports P, T, A, and B as shown in FIG. 3 when the solenoid 28 is deenergized. On the other hand, when exciting current Ic flows through the solenoid 21, the spool 22 is displaced in proportion to the pulse duty of the exciting current Ic, thus controlling the opening of the passage between the pressure port P and the secondary port A or B.

As described above, the arrangement of the subtractor 6 and the adder 10 is opposite to the arrangement thereof in the embodiment shown in FIG. 1. That is, in this embodiment, first, the subtractor 6 determines the deviation between the command signal Vo and the detection signal Vf outputted from the spool position detector 23, then, the adder 10 adds the compensated deviation signal Ve' and the dither AC signal Vd to each other. The signal Ve$_2$ inputted to the noninverting terminal of the comparator 8 is identical to the signal Ve shown in FIG. 1. Further, similarly to the signal Ve, the signal Ve$_2$ is pulse width-modulated by the carrier wave Va of 5 KHz. Accordingly, the operations and advantages of both embodiments are similar to each other as described with reference to FIG. 2. But the control characteristic of the solenoid controlled proportional throttling directional control valve 20 of the embodiment shown in FIG. 3 is more favorable than that of the solenoid controlled valve SV of the embodiment shown in FIG. 1 because the compensation circuit 14 compensates the deviation signal Ve and the subtractor 15 performs a feedback compensation of the control signal Vc inputted to the voltage-current converter 13.

Figure 16:
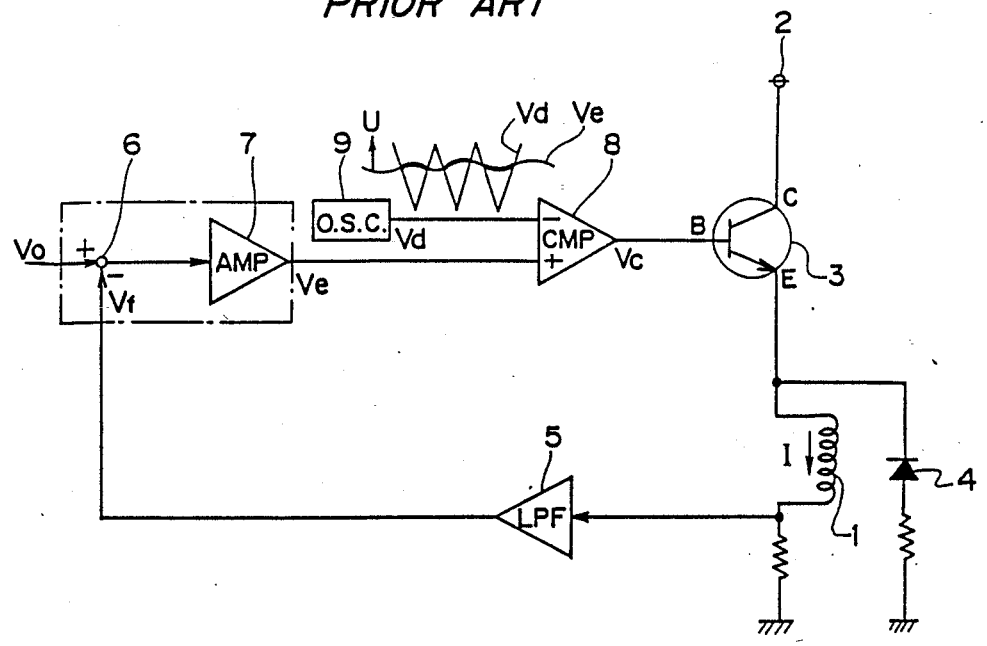
FIG. 16 is a block diagram showing a known hydraulic control apparatus.

That is, in the known hydraulic control apparatus shown in FIG. 16, the frequency of the command signal Vo whose gain decreases by $-3$ dB is 30 Hz and the frequency of the command signal Vo whose phase delay is 90° is 20 Hz whereas in this embodiment, the former is 100 Hz and the latter is 90 Hz. Thus, the frequency band in which a favorable response can be obtained is three times as great as that of the known hydraulic control apparatus.

Figure 4:
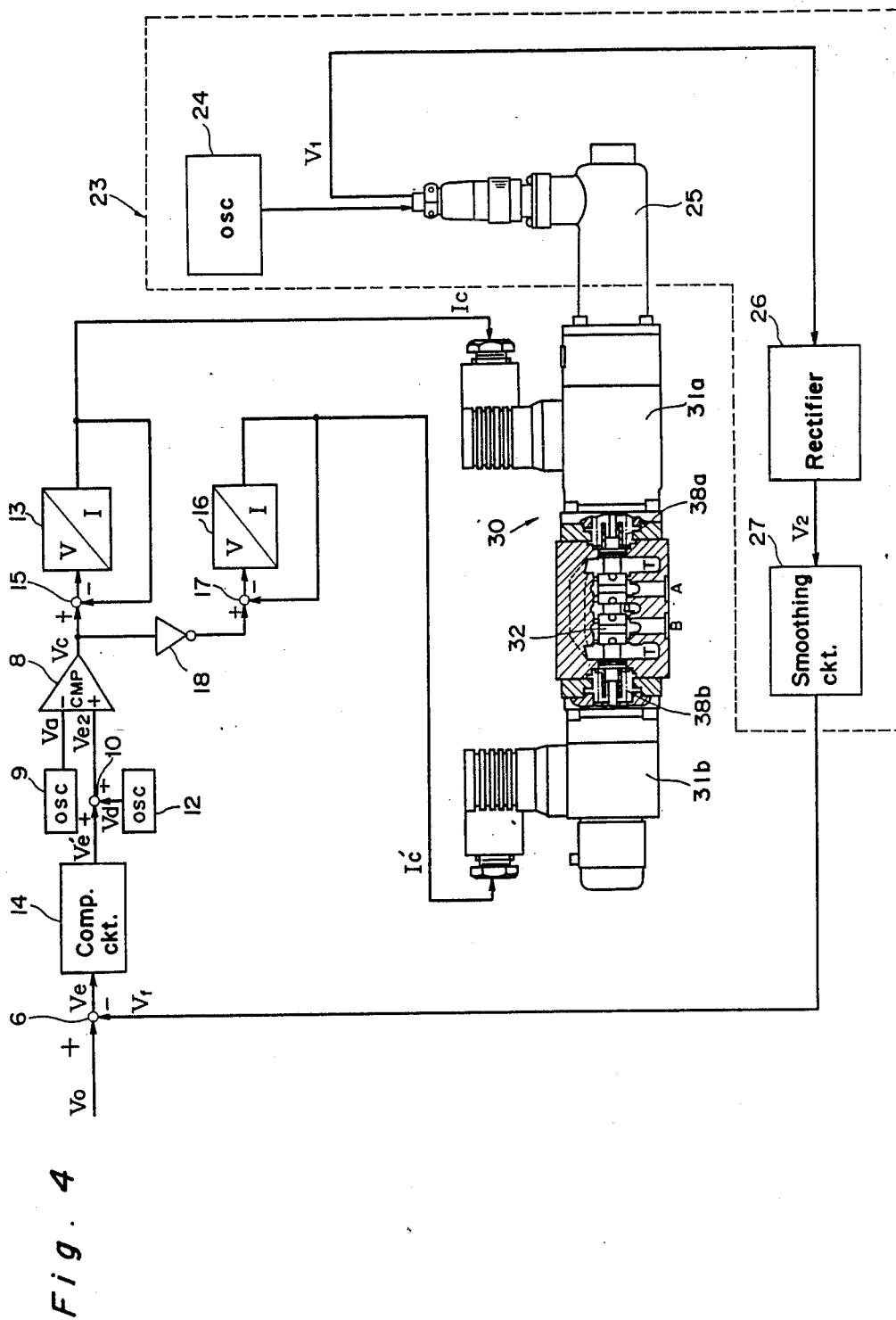
FIG. 4 is a block diagram showing an example in which a double solenoid controlled valve of direct-acting type is used.

In the directional control valve of the hydraulic control apparatus shown in FIG. 4, a spring center type-proportional throttling directional control valve 30 is used instead of the proportional throttling directional control valve 20 of the spring offset direct-acting type used in the embodiment shown in FIG. 3. The directional control valve 30 is provided with a first solenoid 31$a$ and a second solenoid 31$b$ at both end portions thereof. The following members are added to the electric circuit of the embodiment shown in FIG. 3: An inverter 18 for inverting the control signal Vc outputted from the comparator 8, a feedback compensating subtractor 17 and a second voltage-current converter 16. The subtractor 17 calculates the difference between the signal outputted from the inverter 18 and the signal outputted from the second voltage-current convertor 16. The second voltage-current convertor 16 converts a signal outputted from the subtractor 17 into exciting current Ic' so as to output the exciting current Ic' to the second solenoid 31$b$. In this embodiment, when the voltage of the control signal Vc is positive, the exciting current Ic is supplied to the first solenoid 31$a$ through the voltage-current converter 13. When the voltage of the control signal Vc is negative, the exciting current Ic' is supplied to the second solenoid 31$b$ through the voltage-current converter 16. Thus, a spool 32 is displaced against the urging force of a spring 38$b$ or 38$a$. The construction of a spool position detector 23 is identical to the spool position detector 23 shown in FIG. 3.

Similarly to the embodiment shown in FIG. 3, the comparator 8 pulse width-modulates the signal Ve$_2$ generated by superposing the dither AC signal Vd on the compensated deviation signal Ve' using the carrier wave Va of 5 KHz. Therefore, the operation and advantage of this embodiment are similar to those of the embodiment shown in FIG. 3. Further, compared with the embodiment shown in FIG. 3 in which the spool 22 is returned to its normal position by the spring force of the throttling directional control valve 20, according to this embodiment, the spool 32 is strongly urged to its normal position by the second solenoid 31$b$. Therefore, the response characteristics of the hydraulic system is more favorable than that of the embodiment shown in FIG. 3 owing to the high speed operation of the spool.

Figure 5:
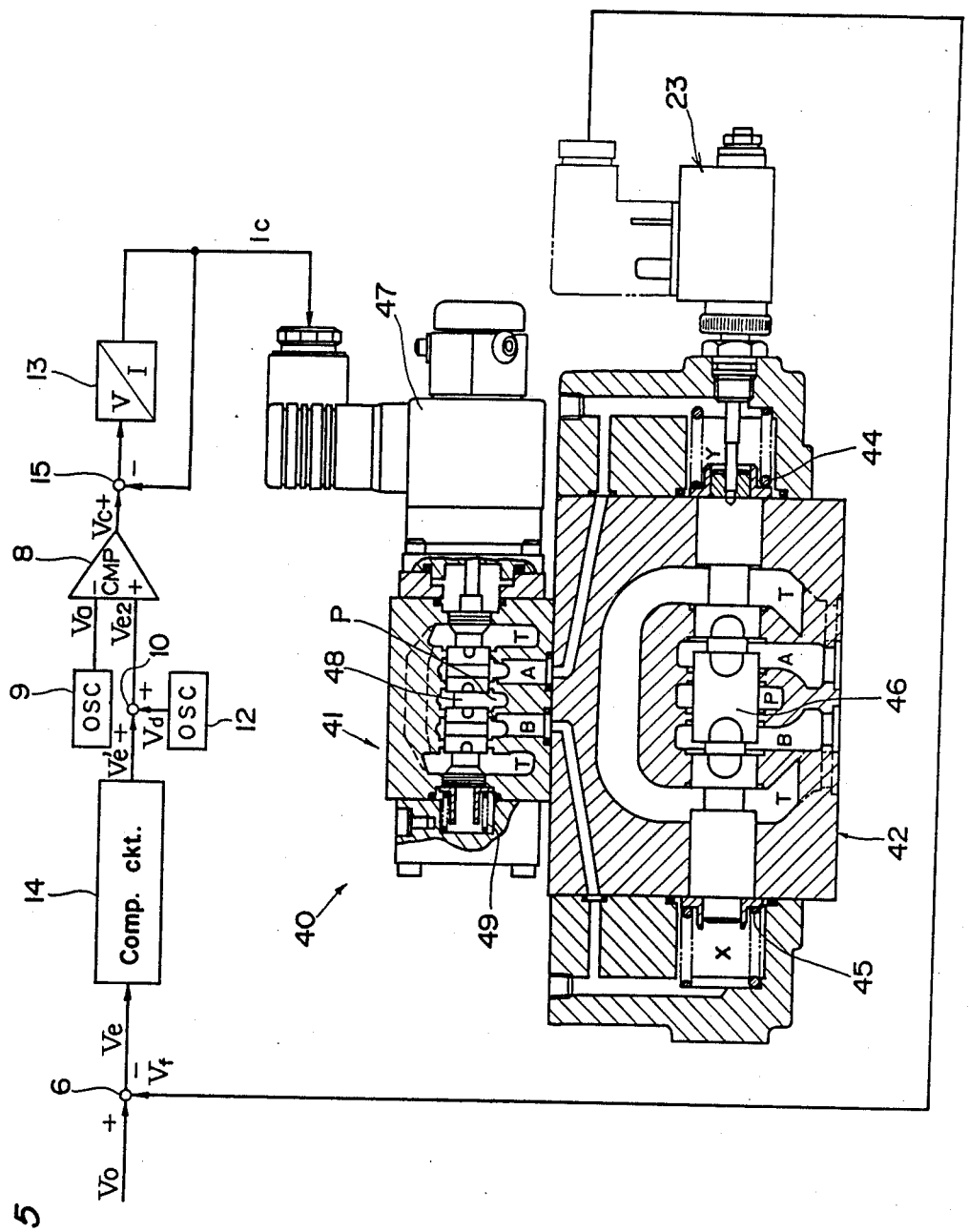
FIG. 5 is a block diagrams showing an example in which a solenoid controlled pilot operated valve is used.

The same electric circuit as that of the embodiment shown in FIG. 3 is used in an embodiment shown in FIG. 5, but a solenoid controlled valve 40 of this embodiment consists of a spring offset type solenoid controlled proportional pilot valve 41 to be operated by the exciting current Ic outputted from the voltage-current converter 13 and a spring center type throttling directional control valve 42 to be operated by hydraulic oil flowing through the pilot valve 41.

Figure 6:
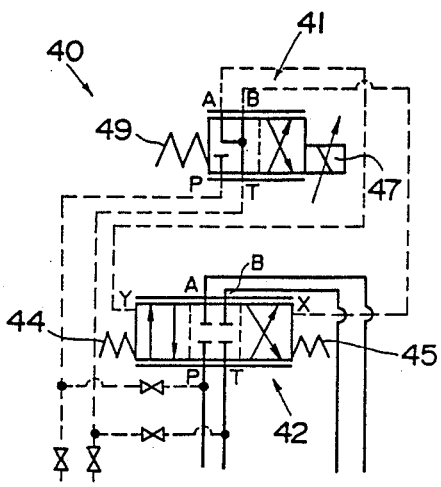
FIG. 6 is a diagram showing the solenoid controlled pilot valve shown in FIG. 5.

As shown in FIG. 6, in the throttling directional control valve 42, all ports P, T, A, and B are closed at its center valve position Hydraulic oil introduced to a pilot port X allows the slidable movement of a spool 46 against the urging force of a spring 44 so that the ports P and B, and T and A communicate with each other, respectively. On the other hand, hydraulic oil introduced into a pilot port Y allows the slidable movement of the spool 46 against the urging force of a spring 45 so that the ports P and A, and T and B communicate with each other, respectively. The displacement of the spool 46 is detected by a spool position detector 23 having the same construction as the spool position detector 23 shown in FIG. 3, and a detection signal Vf corresponding to the detected position of the spool is outputted to the subtractor 6 of the electric circuit The solenoid controlled proportional pilot valve 41 allows the ports T, A, and B to communicate with each other at its normal position, thus communicating both pilot ports X and Y of the throttling directional control valve 42 and a tank with each other. At this time, the throttling directional control valve 42 is located at its center valve position. The spool 48 slides against the urging force of a spring 49 in proportion to the pulse duty of the exciting current Ic supplied to the solenoid 47, thus introducing hydraulic oil into the pilot port X of the throttling directional control valve 42 through the ports P and B of the pilot valve 41 and at the same time, communicating the pilot port Y of the throttling directional control valve 42 with the tank through the ports A and T. At this time, the throttling directional control valve 42 is switched to the symbol position in the right in FIG. 6.

Since the electric circuit of this embodiment is the same as that of the embodiment shown in FIG. 3, the operation and advantage of this embodiment are similar to those of the embodiment shown in FIG. 3. Compared with a solenoid operated valve, the solenoid controlled pilot operated valve is likely to cause the compensation circuit 14 to give rise to the phase delay of a signal. Nevertheless, the response speed of the hydraulic system is favorable because the oscillator 12 which outputs a dither AC signal Vd operates as a proportional element. Therefore, the dither AC signal Vd superposed on the compensated deviation signal Ve' prevents the spool 48 of the pilot valve 41 from being subjected to a friction with and an adherence to the cylindrical chamber Further, even though the frequency of the command signal Vo becomes as high as approximately 1 KHz, the throttling directional control valve can be controlled with a high gain and prompt response with a small amount of phase delay A hydraulic control apparatus embodiment shown in FIG. 7 further includes the following members in addition to the solenoid controlled proportional pilot valve 41 shown in FIG. 5: A second spool position detector 23' which detects the displacement of the spool 48 and is mounted on the solenoid controlled proportional pilot valve 41; a second subtractor 6' which subtracts the detection signal Vf' outputted from the spool position detector 23' from the compensated deviation signal Ve' outputted from the compensation circuit 14; and an amplifier 19 which compensates the phase of the pilot valve 41 and amplifies a signal $Ve_2(=Ve'-Vf')$ outputted from the second subtractor 6', thus outputting a signal to the adder 10. In this embodiment, the negative feedback of the detection signal Vf' outputted from the spool position detector 23' to the compensated deviation signal Ve' is performed. Accordingly, the hydraulic system of this embodiment is more stable than that of the embodiment shown in FIG. 5. Thus, the control performance of the throttling directional control valve 42 is more superior to that of the embodiment shown in FIG. 5.

Figure 8:
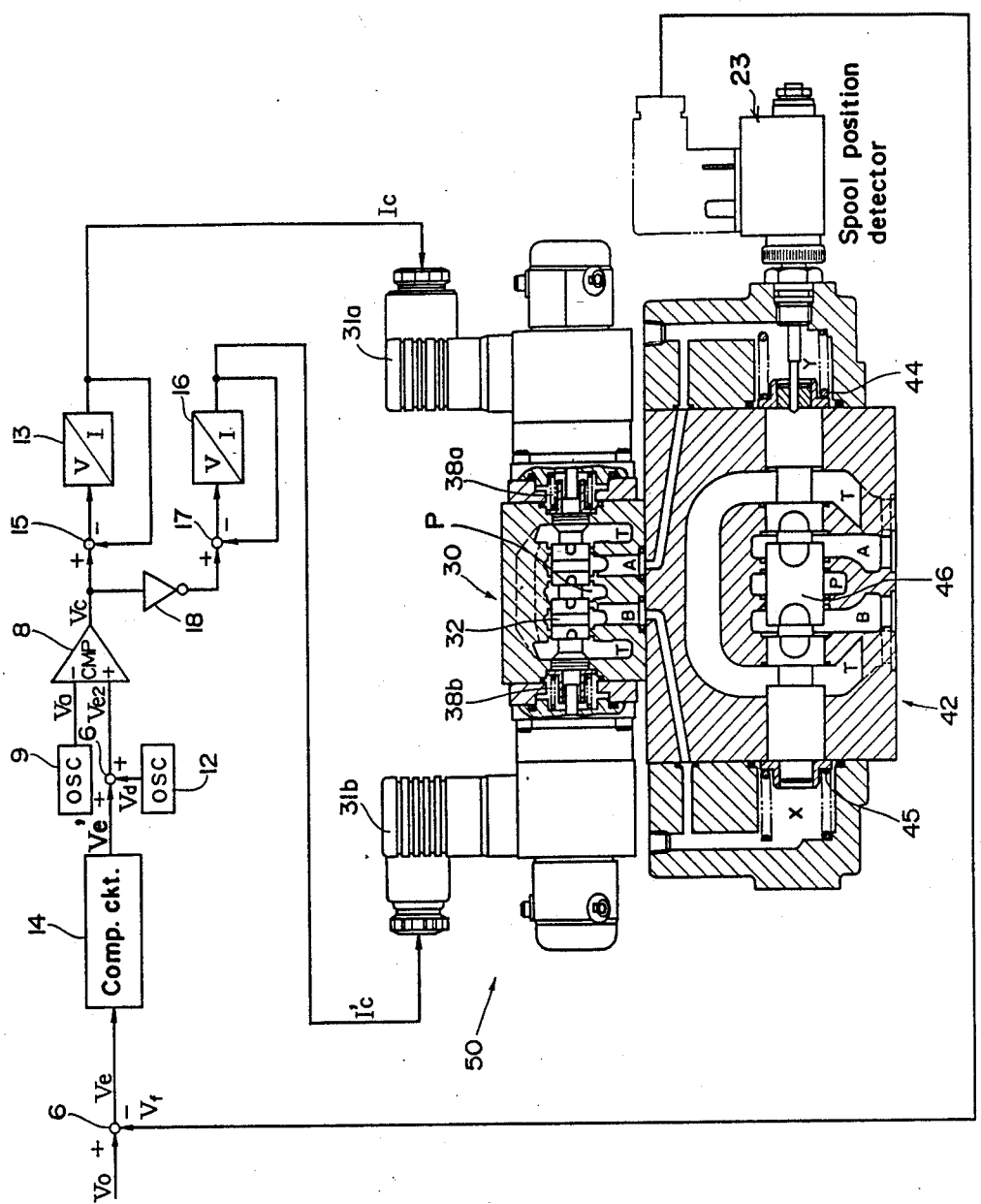
FIG. 8 is a block diagram showing a in which a double solenoid controlled pilot valve is used.

An embodiment shown in FIG. 8 is described below. In this embodiment, the electric circuit of a hydraulic control apparatus shown in FIG. 8 is the same as that shown in FIG. 4. The solenoid controlled proportional throttling directional control valve 50 of this embodiment comprises the pilot valve 30 of the same solenoid controlled proportional throttling directional control valve as that shown in FIG. 4 except for not having the spool position detector 23 used in the embodiment shown in FIG. 4, and the same throttling directional control valve 42, as that shown in FIG. 5, to be operated by hydraulic fluid which flows through the pilot valve 30.

Figure 9:
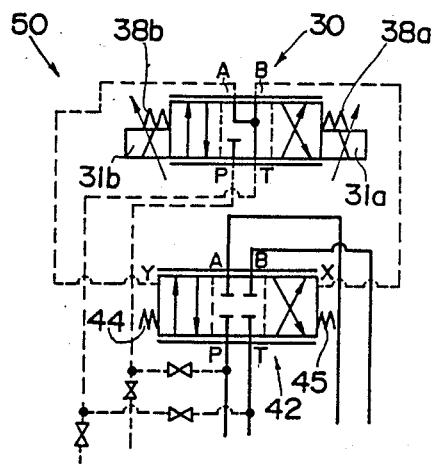
FIG. 9 is a diagram showing the solenoid controlled pilot valve shown in FIG. 8.

As shown in the lower portion of FIG. 9, the construction of the throttling directional control valve 42 is the same as that described previously (refer to the lower portions of FIGS. 5 and 6.). When the solenoids 31a and 31b are deexcited, i.e., when the pilot valve 30 is located at its center valve position, it communicates both ports X and Y of the throttling directional control valve 42 with a tank through ports A, B, and T of the pilot valve 30, thus locating the throttling directional control valve 42 in its center valve position When the voltage of the control signal Vc outputted from the comparator 8 is positive, the pilot valve 30 is switched to the symbol position in the right in FIG. 9 in proportion to the exciting current Ic supplied to the first solenoid 31a through the voltage current converter 13, thus switching the throttling directional control valve 42 to be located at the symbol position in the right shown in FIG. 9 as a result of the supply of hydraulic oil to the pilot port X and the discharge thereof from the pilot port Y. When the voltage of the control signal Vc outputted from the comparator 8 is negative, the pilot valve 30 is switched to the symbol position in the left in FIG. 9 in proportion to the exciting current Ic, supplied to the second solenoid 31b through the voltage-current converter 16, thus switching the throttling directional control valve 42 to be located at the symbol position in the left shown in FIG. 9 as a result of the discharge of hydraulic oil from the pilot port X and the supply thereof to the pilot port Y.

Since this hydraulic control apparatus of this embodiment comprises the combination of the members of the embodiments shown in FIGS. 4 and 5, the operation and advantage thereof are the combination of the operation and advantage of the embodiments shown in FIG. 4 and 5. That is, the pilot valve 30 performs an operation faster than the pilot valve 41 because the former has two solenoids 31a and 31b whereas the latter has one solenoid 47. Accordingly, even though the frequency of the command signal Vo is high, the throttling directional control valve 42 can be controlled with a response faster than the throttling directional control valve of the embodiment shown in FIG. 5.

Figure 10:
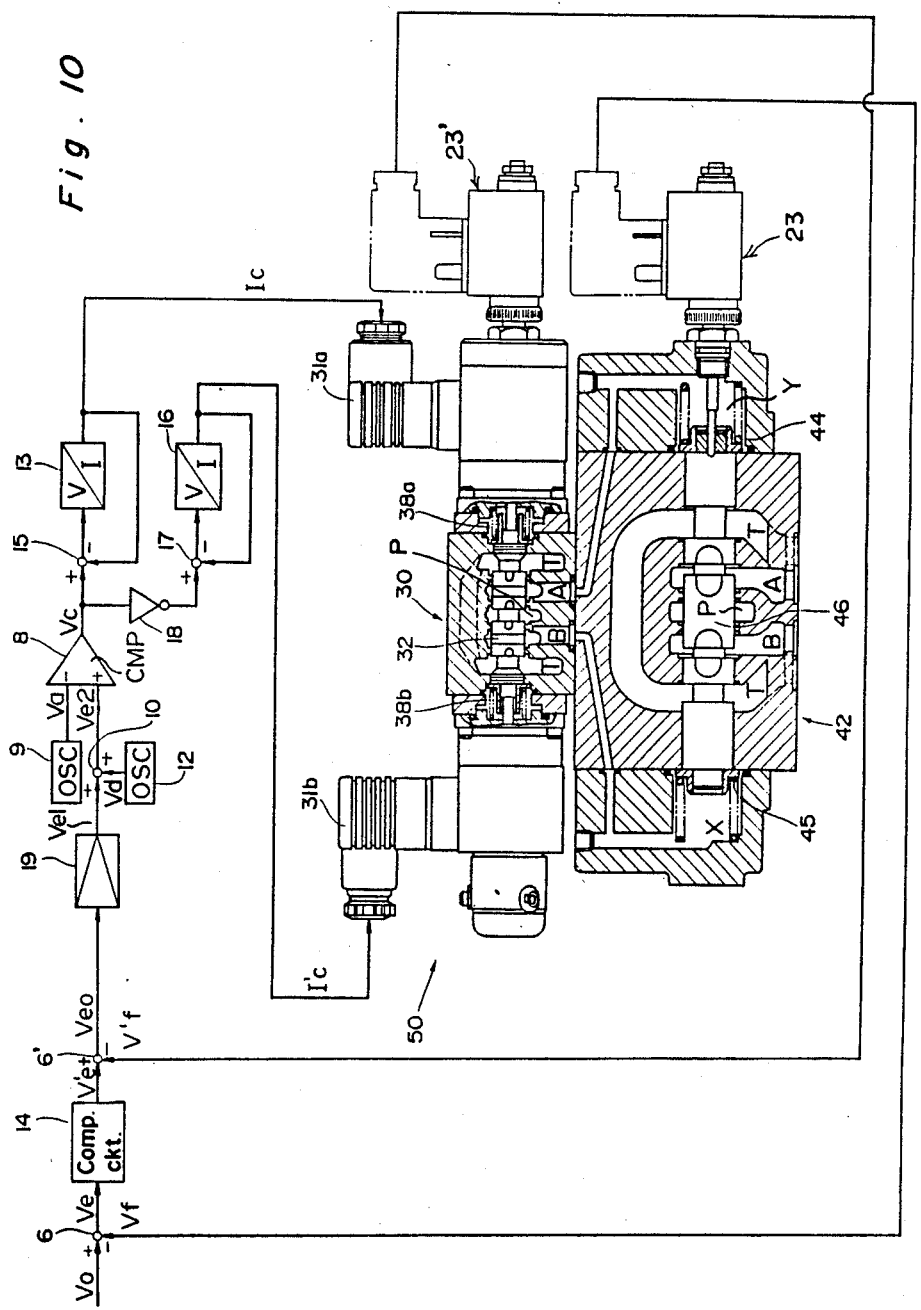
FIG. 10 is a modification of the example shown in FIG. 8.

A hydraulic control apparatus of an embodiment shown in FIG. 10 further includes the following members in addition to the solenoid controlled proportional pilot valve 30 shown in FIG. 8: A second spool position detector 23, which detects the displacement of the spool 32 and is mounted on the solenoid controlled proportional pilot valve 30; a second subtractor 6' which subtracts the detection signal Vf' outputted from the spool position detector 23' from the compensated deviation signal Ve' outputted from the compensation circuit 14; and an amplifier 19 which compensates the phase shift of the pilot valve 30 and amplifies a signal Veo ($=Ve'-Vf'$) outputted from the second subtractor 6', thus outputting a signal to the adder 10. In this embodiment, the negative feedback of the detection signal Vf' outputted from the spool position detector 23' to the compensated deviation signal Ve, is performed. Therefore, the hydraulic system of this embodiment is more stable than that of the embodiment shown in FIG. 8. Thus, the throttling directional control valve 42 can be controlled more favorably than that of the embodiment shown in FIG. 8.

FIG. 11 shows an embodiment in which the same electric circuit as that shown in FIG. 5 is used. A solenoid controlled valve 60 comprises a spring offset type solenoid controlled proportional pilot valve 61 to be operated by the exciting current Ic outputted from the voltage-current converter 13 and a throttling directional control valve 62 having a differential type spool 66 to be operated by hydraulic fluid flowing through the pilot valve 61. The pressure receiving area of one end portion 66a of the spool 66 is half as small as that of a piston 63 pushing the other end portion 66b of the spool 66.

Figure 12:
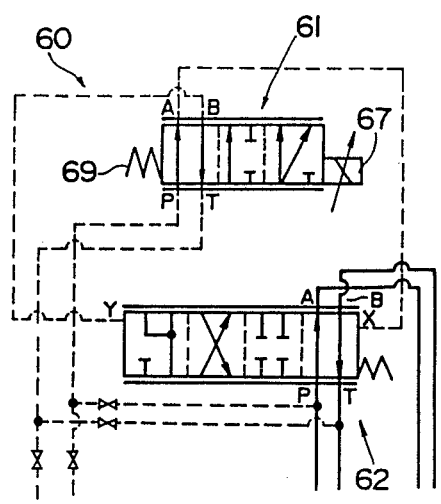
FIG. 12 is a diagram showing the throttling valve shown in FIG. 11.

As shown in FIG. 12, when the solenoid controlled proportional pilot valve 61 is located at its normal position on the left, the ports P and A, and the ports T and B communicate with each other, respectively and consequently, the pilot port X of the throttling directional control valve 62 is communicated with a high pressure line and the port Y thereof is communicated with a tank. Thus, the solenoid controlled proportional pilot valve 61 locates the throttling directional control valve 62 at the symbol position (P and A, T and B are communicated with each other, respectively) in the right in FIG. 12. When a solenoid 67 is excited to the greatest extent, i.e., when the pilot valve 61 is positioned at the symbol position in the right in FIG. 12, hydraulic fluid is introduced into both pilot ports X and Y of the throttling directional control valve 62 through the ports P, A, and B of the pilot valve 61. As a result, the spool 66 slides toward the right in FIG. 11 because the pressure receiving area of one end portion 66a thereof is half as small as that of the end portion 63a of the piston 3. As a result, the throttling directional control valve 2 is switched to the symbol position (A, B, and T are communicated with each other) in the left of FIG. 12.

That is, the spool 68 of the pilot valve 61 slides in proportion to the exciting current Ic supplied to the solenoid 67 against the urging force of the spring 69, thus applying pressure ranging from 0 kg/cm$^2$ to pressure of the high pressure line to the pilot port Y through the port B of the pilot valve 61 depending on the displacement of the spool 68 while the pressure of the high pressure line is applied to the pilot port X through the port A of the pilot valve 61 irrespective of the displacements of the spool 68. Thus, the spool 66 of the throttling directional control valve 62 slides to the position in which Py=2 Px is satisfied, where Px is the pressure of the pilot port X and Py is the pressure of the pilot port Y. Thus, the position of the spool 66 is switched from the symbol position in the right to the symbol position in the left in FIG. 12 (P, A and T, B are communicated with each other, respectively; all the ports are closed; P, B and T, A are communicated with each other, respectively; and A, B, and T are communicated with each other). The spool position detector 23 detects the displacement of the spool 66, thus outputting the detection signal Vf to the subtractor 6. The spring 64 mounted on one end portion 63 of the piston 63 serves as a means for stopping the spool 66 at a rest position and the urging force thereof is not as strong as that of the spring 44 of the throttling directional control valve 44 shown in FIG. 5.

As described above, according to this embodiment, the directional control valve 62 is constructed by modifying the constructions of the pilot valve 41 and the throttling directional control valve 42 shown in FIG. 5. That is, the spool 66 of the throttling directional control valve 62 is slid by the hydraulic pressure supplied from the pilot valve 61 not by the urging force of a spring. Therefore, compared with the throttling directional control valve 42 shown in FIG. 5 in which the spool 46 is returned by the springs 44 and 45, the operation force of the spool 66 is greater than that of the spool 46 of the embodiment shown in FIG. 5. Accordingly, the response speed of the throttling directional control valve 62 is faster than the throttling directional control valve 42 of the embodiment shown in FIG. 5 and the throttling directional control valve 62 can be utilized as a servo valve which is required to be controlled with a high control performance.

Figure 13:
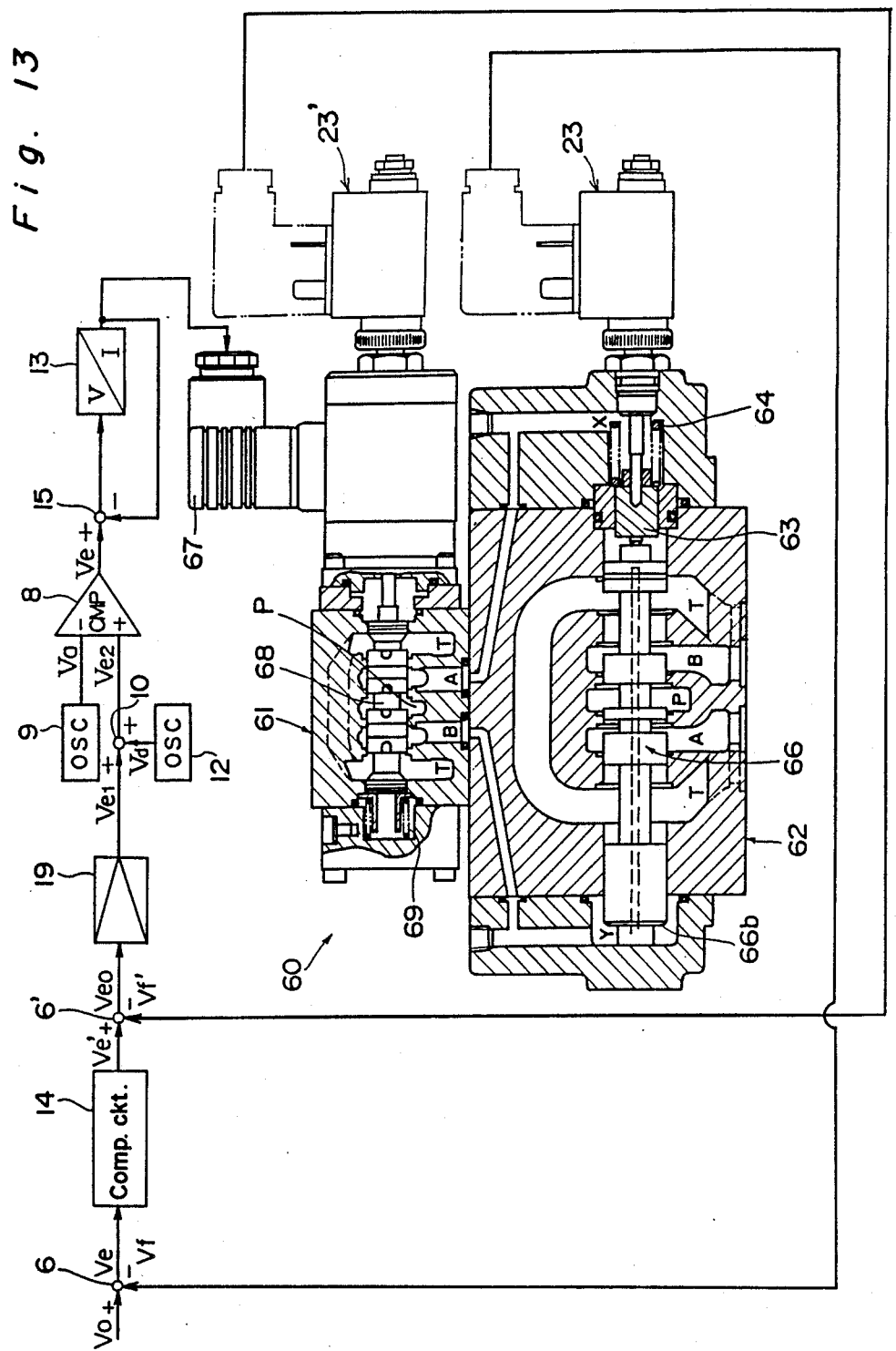
FIG. 13 is a modification of the example shown in FIG. 11.

A hydraulic control apparatus of the embodiment shown in FIG. 13 further includes the following members in addition to the solenoid controlled proportional throttling pilot valve 61 shown in FIG. 11: A second spool position detector 23' which detects the displacement of the spool 68 and is mounted on the solenoid controlled proportional pilot valve 61; a second subtractor 6' which subtracts the detection signal Vf' outputted from the spool position detector 23' from the compensated deviation signal Ve' outputted from the compensation circuit 14; and an amplifier 19 which compensates the phase shift of the pilot valve 61 and amplifies the signal Ve$_o$ ($=Ve'-Vf'$) outputted from the second subtractor 6', thus outputting a signal to the adder 10. In this embodiment, in addition to the negative feedback of the deviation signal Ve, the negative feedback of the detection signal Vf' outputted from the spool position detector 23' to the compensated deviation signal Ve' is performed. Therefore, the hydraulic system of this embodiment is more stable than that of the embodiment shown in FIG. 11. Thus, the throttling directional control valve 62 can be controlled more favorably than that of the embodiment shown in FIG. 11.

Figure 14:
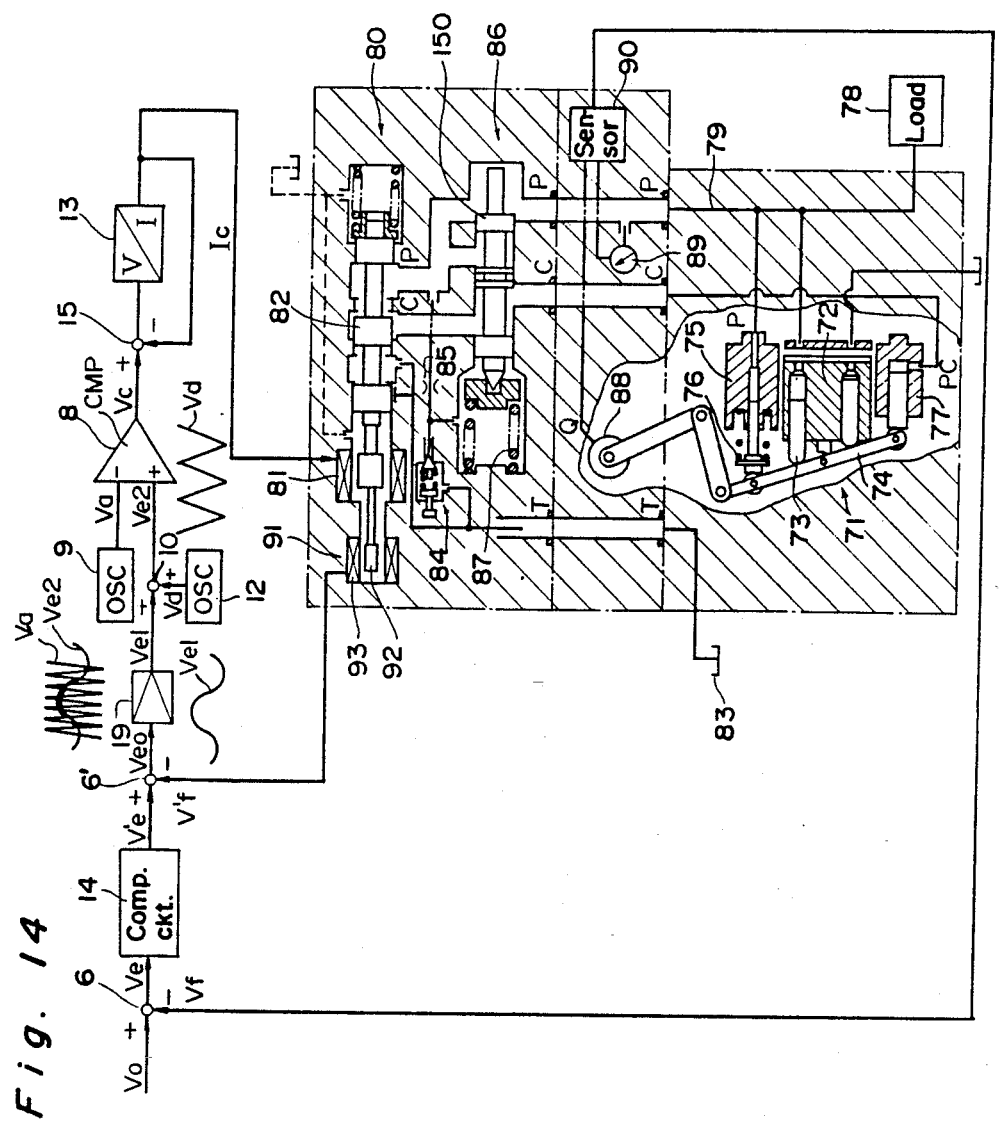
FIG. 14 is a block diagram showing an embodiment in which a variable displacement hydraulic pump is used.

The electric circuit of an embodiment shown in FIG. 14 is the same as that shown in FIG. 13. But, the solenoid controlled valve employed in this embodiment is different from that of the embodiment shown in FIG. 13. That is, the solenoid controlled valve of this embodiment is a solenoid controlled proportional throttling directional control valve 80 for controlling the supply of hydraulic fluid to a servo cylinder 77 for controlling a swash plate of a variable displacement hydraulic pump 71 and discharge of the hydraulic fluid therefrom.

In the variable displacement hydraulic pump 71, the swash plate 74 regulates the stroke of a piston 73 fitted in a cylinder block 72 to be rotatably driven. A bias cylinder 75 and a bias spring 76 push one end of the swash plate 74 counterclockwise to incline the swash plate 74 and a servo cylinder 77 pushes the other end of the swash plate 74 toward the neutral position, whereby the discharge amount of hydraulic fluid is controlled The pressure port P of the solenoid controlled proportional throttling directional control valve 80 is communicated with the pressure line 79 of the hydraulic pump 71 communicated with a load 78 as well as the bias cylinder 75. A secondary port C of the throttling directional control valve 80 communicating with the servo cylinder 77 is communicated either with the pressure port P or the tank port T by a spool 82 which slides in proportion to the exciting current Ic supplied to a solenoid 81 so that the discharge amount of hydraulic fluid of the hydraulic pump 71 is controlled. The pressure line 79 is connected with, through the throttle 85, a pilot relief valve 84 which opens at a predetermined high pressure and discharges hydraulic fluid to the tank 83. Because the spool 150 to a safety valve 86 is slid to the left in FIG. 14 against the spring 87 by the differential pressure generated forward and backward of the throttle 85 due to the discharge of the hydraulic fluid to the tank, the pressure port P of the safety valve 86 and the secondary port C thereof are communicated with each other. Thus, a high pressure in the pressure line 79 is applied to the servo cylinder 77 so as to rapidly reduce the discharge amount of the hydraulic fluid from the hydraulic pump 71.

The detecting section of the hydraulic control apparatus of this embodiment comprises a sensor 88 for detecting the inclination, of the swash plate 74, which corresponds to the amount of the hydraulic oil discharged from the hydraulic pump 71; a sensor 89 for detecting the discharge pressure of the hydraulic oil; a sensor circuit 90 which selects either of the detection signals Vf outputted from both sensors 88 and 89, thus outputting a selected signal Vf to the subtractor 6 of the electric circuit; and a differential transformer 91 including a movable core 92 fixed to one end of the spool 82 and coils 93 which surround the movable core 92. The differential transformer 91 outputs the detection signal Vf, indicative of the displacement of the spool 82 to the second subtractor 6'.

The operation of the hydraulic control apparatus of this embodiment is described below.

The subtractor 6 determines the deviation between the command signal Vo indicative of target discharge pressure of the hydraulic fluid or target discharge amount thereof and the detection signal Vf indicative of the discharge pressure of the hydraulic fluid or the discharge amount thereof which are outputted from the sensor circuit 90, thus outputting the deviation signal Ve $(=Vo-Vf)$ to the compensation circuit 14. The compensation circuit 14 compensates the deviation signal Ve, thus outputting the compensated deviation signal Ve' to the subtractor 6'. The subtractor 6' subtracts the detection signal Vf outputted from the differential transformer 91 of the throttling directional control valve 80 from the compensated deviation signal Ve', thus outputting the signal Ve$_o$ $(=Ve'-Vf)$ produced by the subtraction to the amplifier 19. The amplifier 19 amplifies the signal Ve$_o$, thus outputting an amplified signal Ve$_1$ to the adder 10.

The adder 10 adds the signal Ve$_1$ whose waveform is shown in FIG. 14, outputted from the amplifier 19 and an AC signal Vd (100-400 Hz) whose waveform is shown in FIG. 14, outputted from the oscillator 12 to each other, thus outputting a signal Ve$_2$ $(=Ve_1+Vd)$ generated by the addition to the noninverting terminal of the comparator 8. The comparator 8 pulse width-modulates the signal Ve$_2$ inputted to the noninverting terminal thereof using the carrier wave Va (5 KHz), whose waveform is shown in FIG. 14, outputted from the oscillator 9, thus outputting the control signal Vc to the voltage-current converter 13 through the feedback compensating subtractor 15. The ratio of the ON time of the control signal Vc to the OFF time thereof shown by the heavy lines in FIG. 14 becomes great with the increase of the level of the signal Ve$_2$. The voltage-current converter 13 outputs the exciting current Ic, which is rapidly turned on and off at a high speed, to the solenoid 81 of the throttling directional control valve 80 only when the voltage signal Vc is ON. In the throttling directional control valve 80, the spool 82 is displaced in proportion to the pulse duration of the exciting current Ic. Thus, the throttling directional control valve 80 displaces a spool 82 in proportion to purse duration of exciting current Ic and controls the openings of the pressure port P, the secondary port C, and the tank port T so as to control the supply of hydraulic fluid to and the discharge thereof from the servo cylinder 77 of the hydraulic pump 71. Thus, the amount of the hydraulic fluid discharged from the hydraulic pump 71 is controlled by performing a feedback so that the discharge amount of the hydraulic fluid approaches a discharge pressure or a discharge amount indicated by the command signal Vo.

Figure 18:
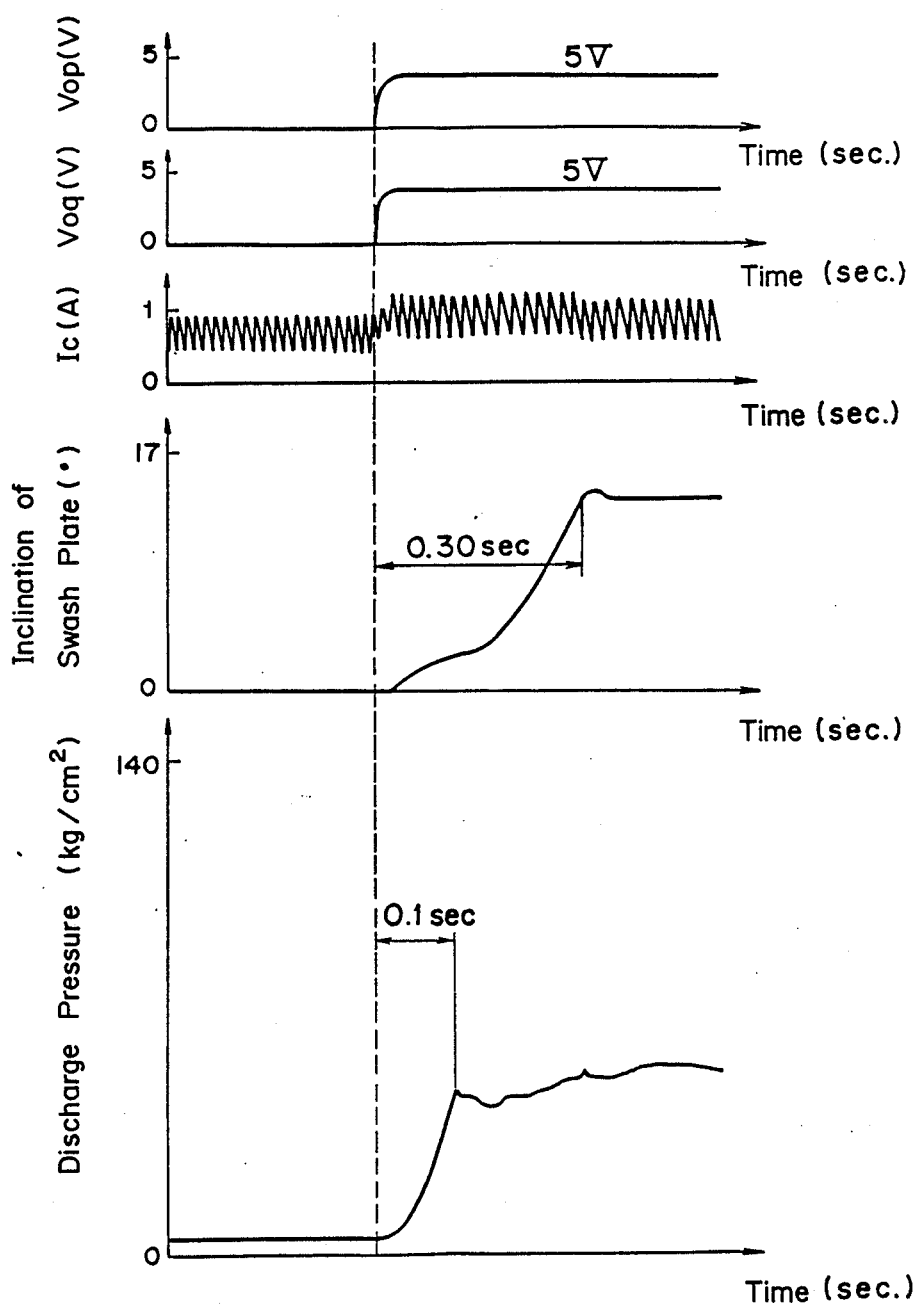
FIG. 18 is a graph showing the operation characteristics of a known hydraulic pump.

In this operation, since the command signal Vo is pulse width-modulated by the carrier wave Va having a frequency higher than the maximum frequency of the command signal Vo, the signal Vo which alternates at a high speed can always be faithfully pulse width-modulated. As shown in FIG. 18, in the known voltage-current converter and the sensor circuit, there is a great phase delay of a signal and a rapid reduction and great fluctuation of the gain of exciting current whereas in the voltage-current converter and the sensor circuit in accordance with this embodiment, there are no such disadvantages Thus, the variable displacement hydraulic pump 71 can be controlled with a very fast response and a high gain. Further, the hydraulic circuit is not susceptible to an external disturbance.

Figure 15:
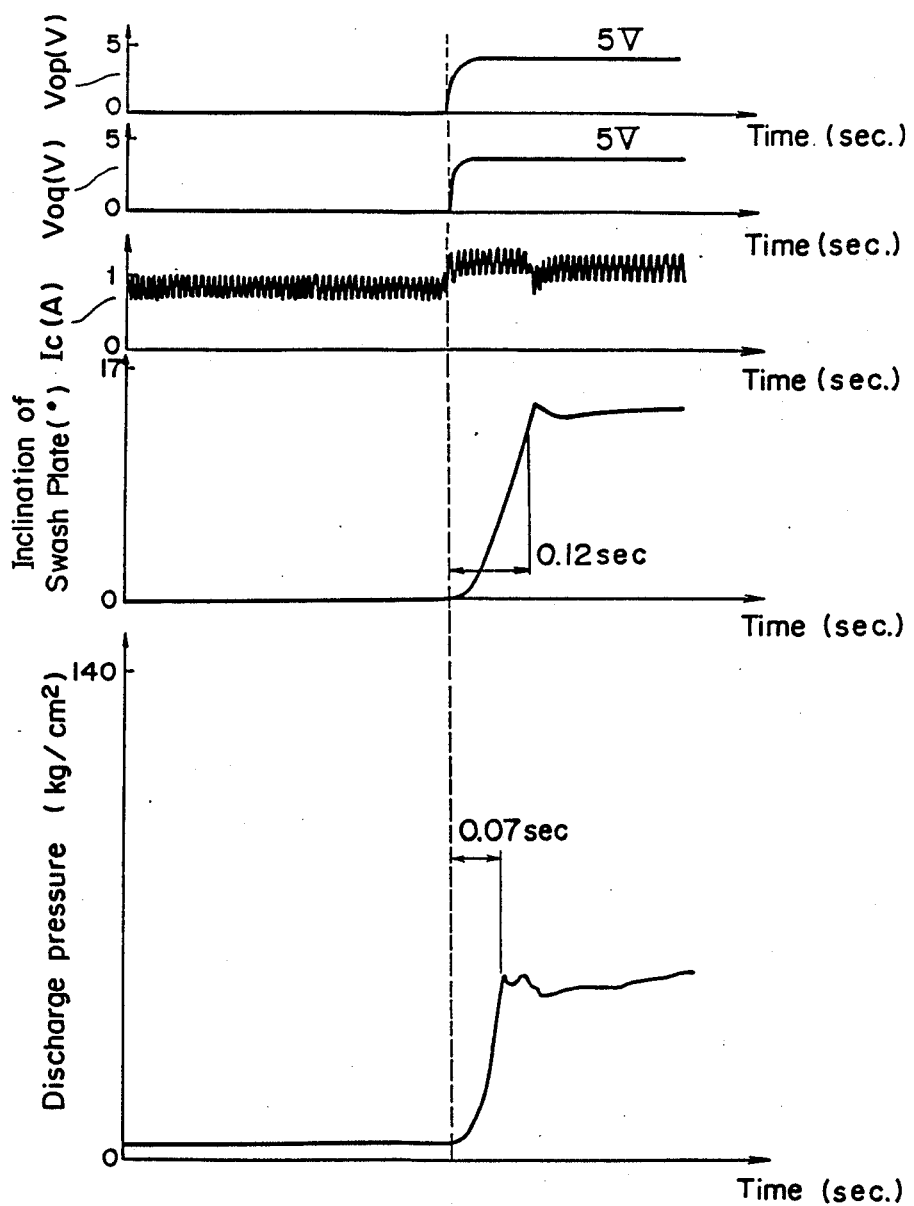
FIG. 15 is a graph showing the operation characteristics of the hydraulic pump.

This is apparent from the graph shown in FIG. 15 showing the changes of the exciting current Ic, the inclination of the swash plate 74, and the discharge pressure which occur when the command signals V$_{op}$ and V$_{oq}$ are inputted to the hydraulic control apparatus. That is, the exciting current Ic and the inclination of the swash plate 74 achieve a normal condition, respectively as short as 0.12 seconds which corresponds to $\frac{1}{3}$ of the period required for the known hydraulic control apparatus to do so. The graphs shown in FIG. 18 indicates that the response speed of electric current and flow rate of hydraulic oil can be outstandingly improved and the control system of the hydraulic control apparatus of this embodiment can withstand an external disturbance. In addition, the period of time for the pressure to increase appropriately is less than 0.07 seconds. This time period is shorter than that is required for the known hydraulic control apparatus to do so. Further, in the hydraulic control apparatus of this embodiment, there is only a small amount of pressure fluctuation after pressure has risen to an appropriate pressure.

Furthermore, since the adder 10 adds the AC signal Vd corresponding to the dither frequency to the command signal Vo, the spool 82 of the three-port throttling directional control valve 80 can be prevented from being subjected to a friction with and hydraulic lock to the cylindrical chamber by always applying a dither thereto.

In this embodiment, the throttling directional control valve 80 includes the differential transformer 91 for detecting the displacement of the spool 82 and the subtractor 6, performs a negative feedback to the compensated deviation signal Ve, using the detection signal Vf' outputted from the differential transformer. Therefore, the response of the hydraulic pump 71 is excellent.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:

1. A hydraulic control apparatus having a switching element (3) which is changed over by a control signal (Vc) inputted to an input terminal (B) thereof; and a solenoid controlled valve (SV) having a spool actuated by a DC solenoid (1) to be driven by exciting current whose pulse duration has been controlled by the switching element (3) comprising:

an adder (10) for adding a command signal (Vo) and an AC signal (Vd) having a dither frequency to each other;

an oscillator (9) for generating a signal (Va) having a constant frequency higher than the maximum frequency of the command signal (Vo);

a subtractor (6) for subtracting a signal (Vf) representing pulse duration of the exciting current and inputted through a low-pass filter (5) from a signal outputted from the adder (10); and a comparator (8) for comparing a signal (Ve) outputted from the subtractor (6) with a signal (Va) outputted from the oscillator (9), outputting a pulse width-modulated control signal (Vc) to the input terminal (B) of the switching element (3) so as to control the ON and OFF of the switching element (3).

2. A hydraulic control apparatus having a solenoid controlled valve (SV) having a spool (22) driven by DC solenoid means (21); a detecting section for detecting the displacement of the spool of the solenoid controlled valve (SV); a subtractor (6) for subtracting a detection signal (Vf) outputted from the detecting section from a command signal (Vo) indicating a target value; a compensation circuit (14) for compensating a deviation signal (Ve) outputted from the subtractor (6) for at least one of gain and phase shift; and a first voltage-current converter (13) for converting a compensated deviation signal (Ve') outputted from the compensation circuit (14) into exciting current (Ic) so as to output the exciting current (Ic) to the DC solenoid means (21) of the solenoid controlled valve (SV) (21) comprising:

an adder for adding an AC signal (Vd) having a dither frequency to the compensated deviation signal (Ve') outputted from the compensation circuit (14);

an oscillator (9) for generating a signal (Va) having a constant frequency higher than the maximum frequency of the command signal (Vo); and a comparator (8) for comparing the signal (Va) outputted from the oscillator (9) and a signal (Ve$_2$) outputted from the adder (10) with each other so as to output a pulse width-modulated voltage signal (Vc) to the first voltage-current converter (13).

3. A hydraulic control apparatus as claimed in claim 2, wherein the solenoid controlled valve (SV) is a solenoid controlled proportional throttling directional control valve (20) of spring offset type and the detecting section is a position detector (23) for detecting the displacement of the spool (22) of the throttling directional control valve (20).

4. A hydraulic control apparatus as claimed in claim 2, wherein the solenoid controlled valve (SV) is a solenoid controlled proportional throttling directional control valve (30) having a first DC solenoid (31a) being the DC solenoid means and a second DC solenoid (31b) being the DC solenoid means at both end portions thereof, respectively and the detecting section is a position detector (23) for detecting the displacement of the spool (32) of the throttling directional control valve (30); and further comprising an inverter (18) and a second voltage-current convertor (16), the voltage signal (Vc) outputted from the comparator (8) being applied to the first solenoid (31a) through the first voltage-current converter (13) and applied to the second solenoid (31b) through the inverter (18) and the second voltage-current converter (16).

5. A hydraulic control apparatus as claimed in claim 2, wherein the solenoid controlled valve (SV) comprises a solenoid controlled proportional throttling pilot valve (41) of spring offset type to be operated by exciting current (Ic) outputted from the voltage-current converter (13) and a spring center type throttling directional control valve (42) to be operated by hydraulic fluid flowing through the pilot valve (41) and urged toward a center valve position by springs (44, 45); and the detecting section is a position detector (23) for detecting the displacement of the spool (46) of the throttling directional control valve (42).

6. A hydraulic control apparatus as claimed in claim 5, wherein the solenoid controlled proportional throttling pilot valve (41) is provided with a second position detector (23') for detecting the displacement of a spool (48) of the pilot valve (41), and further comprising a second subtractor (6') for subtracting the detection signal (Vf') outputted from the second position detector (23') from a compensated deviation signal (Ve') outputted from the compensation circuit (14) so as to output a signal (Ve$_1$) generated by the subtraction to the adder (10).

7. A hydraulic control apparatus as claimed in claim 2, wherein the solenoid controlled valve (SV) comprises a solenoid controlled proportional throttling pilot valve (30) whose a spool (32) is urged toward a center valve position by springs and which has a first DC solenoid (31a) being the DC solenoid means and a second DC solenoid (31b) being the DC solenoid means, and a throttling directional control valve (42) whose a spool (46) is operated by hydraulic fluid flowing through the pilot valve (30) and urged toward a center valve position by springs (44, 45); the detecting section includes a first position detector (23) for detecting the displacement of the spool (46) of the throttling directional control valve (42); and further comprising an inverter (18) and a second voltage current convertor (16), the voltage signal (Vc) outputted from the comparator (8) being applied to the first solenoid (31a) through the first voltage-current converter (13) and applied to the second solenoid (31b) through the inverter (18) and the second voltage-current converter (16).

8. A hydraulic control apparatus as claimed in claim 7, wherein the detecting section further includes a second position detector (23') for detecting the displacement of the spool (32) of the solenoid controlled proportional throttling pilot valve (30), and further comprising a second subtractor (6') for subtracting the detection signal (Vf') outputted from the second position detector (23') from the compensated deviation signal (Ve') outputted from the compensation circuit (14) so as to output the signal (Ve₁) generated by the subtraction to the adder (10).

9. A hydraulic control apparatus as claimed in claim 2, wherein the solenoid controlled valve (SV) comprises a solenoid controlled proportional throttling pilot valve (61) of spring offset type to be operated by the exciting current (Ic) outputted from the voltage-current converter (13) and a throttling directional control valve (62) having a spool (66), a piston (63) and a spring (64) urging the spool (66) into one direction through the piston (63), in which the pressure of hydraulic fluid flowing through the pilot valve (61) is applied to an end of the spool (66) toward the piston (63) and an end of the piston (63) toward the spool (66), and the pressure receiving area of the end of the piston (63) is smaller than that of the spool (66); and the detecting section is a position detector (23) for detecting the displacement of the spool (66) of the throttling directional control valve (62).

10. A hydraulic control apparatus as claimed in claim 9, wherein the detecting section further includes a second position detector (23') for detecting the displacement of the spool (68) of the solenoid controlled proportional throttling pilot valve (61), and further comprising the second subtractor (6') for subtracting the detection signal (Vf') outputted from the second position detector (23') from the compensated deviation signal (Ve') outputted from the compensation circuit (14) so as to output the signal (Ve₁) generated by the subtraction to the adder (10).

11. A hydraulic control apparatus as claimed in claim 2, wherein the solenoid controlled valve (SV) is a solenoid controlled proportional throttling directional control valve (80); the solenoid controlled proportional throttling directional control valve (80) controls the supply of hydraulic fluid to and the discharge from the volume control element (77) of a variable displacement hydraulic pump (71); and the detecting section comprises at least one of a delivery pressure sensor (89) and a delivery flow sensor (88).

* * * * *